United States Patent
Zou et al.

(10) Patent No.: US 11,085,767 B2
(45) Date of Patent: Aug. 10, 2021

(54) THREE-AXIS MEMS GYROSCOPE

(71) Applicant: Senodia Technologies (Shaoxing) Co., Ltd., Shaoxing (CN)

(72) Inventors: Bo Zou, Shanghai (CN); Meihan Guo, Shanghai (CN)

(73) Assignee: SENODIA TECHNOLOGIES (SHAOXING) CO., LTD, Shaoxing (CN)

( * ) Notice: Subject to any disclaimer, the term of this patent is extended or adjusted under 35 U.S.C. 154(b) by 12 days.

(21) Appl. No.: 16/631,838

(22) PCT Filed: Jul. 18, 2018

(86) PCT No.: PCT/CN2018/096076
§ 371 (c)(1),
(2) Date: Jan. 17, 2020

(87) PCT Pub. No.: WO2019/019942
PCT Pub. Date: Jan. 31, 2019

(65) Prior Publication Data
US 2020/0166341 A1 May 28, 2020

(30) Foreign Application Priority Data
Jul. 24, 2017 (CN) .......................... 201710606894.2

(51) Int. Cl.
*G01C 19/5712* (2012.01)
(52) U.S. Cl.
CPC ................. *G01C 19/5712* (2013.01)
(58) Field of Classification Search
CPC .................. G01C 19/5705; G01C 19/5712
See application file for complete search history.

(56) References Cited

U.S. PATENT DOCUMENTS 4,598,585 A * 7/1986 Boxenhorn ........ G01C 19/5719
73/504.12
5,488,862 A * 2/1996 Neukermans ...... G01C 19/5719
73/504.02

(Continued)

FOREIGN PATENT DOCUMENTS

CN 101050966 A 10/2007
CN 101368826 A 2/2009

(Continued)

OTHER PUBLICATIONS

Machine translation of CN 101050966 A (Year: 2007).*
Machine translation of CN 105444748 A (Year: 2016).*

*Primary Examiner* — David J Bolduc
(74) *Attorney, Agent, or Firm* — Bayramoglu Law Offices LLC

(57) ABSTRACT

A three-axis micro electro mechanical system (MEMS) gyroscope includes a central anchor, a first subsidiary proof mass, a first decoupling structure, a second subsidiary proof mass and a third subsidiary proof mass arranged in order from the inside out. When the first subsidiary proof mass resonates in a driving mode around a third direction, the first subsidiary proof mass approximately moves along the first direction. When the first subsidiary proof mass is subjected to an angular velocity around a second direction, a Coriolis force is generated along the third direction, and the first subsidiary proof mass produces a displacement around the first direction under the effect of the Coriolis force. The axis of the first decoupling structure is also in the first direction.

12 Claims, 4 Drawing Sheets

(56) References Cited

U.S. PATENT DOCUMENTS

| | | | | |
|---|---|---|---|---|
| 6,915,693 B2* | 7/2005 | Kim | G01C 19/5762 | 73/504.12 |
| 8,256,290 B2* | 9/2012 | Mao | G01C 19/5719 | 73/504.12 |
| 8,616,057 B1* | 12/2013 | Mao | G01C 19/574 | 73/504.14 |
| 8,689,632 B2 | 4/2014 | Jia et al. | | |
| 9,689,678 B2* | 6/2017 | Jeanroy | G01C 19/5747 | |
| 9,869,551 B2* | 1/2018 | Jeanroy | G01C 19/574 | |
| 10,168,154 B2* | 1/2019 | Cazzaniga | G01P 9/02 | |
| 10,209,071 B2* | 2/2019 | Coronato | G01C 19/5712 | |
| 10,732,199 B2* | 8/2020 | Painter | G01P 15/125 | |
| 2003/0216884 A1* | 11/2003 | Cardarelli | G01C 21/16 | 702/145 |
| 2004/0149035 A1* | 8/2004 | Acar | G01C 19/5719 | 73/504.12 |
| 2005/0199061 A1* | 9/2005 | Acar | G01C 19/5719 | 73/504.02 |
| 2006/0032308 A1* | 2/2006 | Acar | G01C 19/5719 | 73/504.12 |
| 2007/0131030 A1* | 6/2007 | Jeong | G01C 19/5747 | 73/504.12 |
| 2007/0272015 A1* | 11/2007 | Kazama | G01C 19/5712 | 73/504.08 |
| 2010/0083756 A1* | 4/2010 | Merz | G01C 19/5762 | 73/504.12 |
| 2011/0030473 A1* | 2/2011 | Acar | G01P 15/125 | 73/504.12 |
| 2011/0061460 A1* | 3/2011 | Seeger | G01C 19/5712 | 73/504.12 |
| 2011/0094301 A1* | 4/2011 | Rocchi | G01C 19/574 | 73/504.08 |
| 2011/0094302 A1 | 4/2011 | Schofield et al. | | |
| 2011/0303007 A1* | 12/2011 | Rocchi | G01C 19/574 | 73/504.09 |
| 2012/0152019 A1* | 6/2012 | Kuhlmann | G01C 19/5712 | 73/504.12 |
| 2013/0068018 A1* | 3/2013 | Seeger | G01C 19/5747 | 73/504.12 |
| 2013/0167636 A1* | 7/2013 | Coronato | G01C 19/5719 | 73/504.12 |
| 2013/0180332 A1* | 7/2013 | Jia | G01C 19/5762 | 73/504.12 |
| 2013/0192369 A1* | 8/2013 | Acar | G01C 19/5718 | 73/514.01 |
| 2014/0345379 A1* | 11/2014 | Hammer | G01C 19/5712 | 73/504.12 |
| 2016/0231114 A1* | 8/2016 | Kim | G01C 19/5712 | |
| 2016/0370403 A1* | 12/2016 | Merdassi | G01P 15/18 | |
| 2017/0284804 A1* | 10/2017 | Gattere | G01C 19/5747 | |
| 2020/0263988 A1* | 8/2020 | Blomqvist | G01C 19/5712 | |

FOREIGN PATENT DOCUMENTS

| | | |
|---|---|---|
| CN | 105444748 A | 3/2016 |
| CN | 107192384 A | 9/2017 |

* cited by examiner

THREE-AXIS MEMS GYROSCOPE

CROSS REFERENCE TO THE RELATED APPLICATIONS

This application is the national phase entry of International Application No. PCT/CN2018/096076, filed on Jul. 18, 2018, which is based upon and claims priority to Chinese Patent Application No. 201710606894.2, filed on Jul. 24, 2017, the entire contents of which are incorporated herein by reference.

TECHNICAL FIELD

The present disclosure relates to the field of inertial technology, and more particularly to a three-axis MEMS gyroscope.

BACKGROUND

A three-axis micro electro mechanical system (MEMS) gyroscope includes a driving part and a detection part. The angular velocity is measured through the coupling between the driving part and the detection part. The three-axis MEMS gyroscope produces motion under the detection mode in the detection axis due to the Coriolis force effect when there is an angular velocity input perpendicular to the motion axis under the driving mode motion. The angular velocity can be obtained by measuring the displacement under the detection mode.

The traditional three-axis MEMS gyroscope is composed of three independent single-axis gyroscopes including an X-axis gyroscope, a Y-axis gyroscope and a Z-axis gyroscope. Each single-axis gyroscope includes an independent proof mass, a driving structure and a detection structure, and the corresponding application specific integrated circuit (ASIC) is driven by three separate sets of drive circuits, thereby leading to a large and bulky three-axis gyroscope.

Another kind of three-axis MEMS gyroscope with shared proof masses was created in order to solve the size issue of three-axis MEMS gyroscopes. This type of gyroscope includes three sets of proof masses, one set of driving structures and three sets of detection structures, wherein the one set of driving structures is used to simultaneously drive the three sets of proof masses respectively corresponding to the X axis, Y axis and Z axis. This kind of three-axis MEMS gyroscope saves an area equal to the area of two sets of driving structures, and the corresponding ASIC can also save the area equal to the area of two sets of drive circuits. However, in the three-axis gyroscope MEMS with shared proof masses, when the driving structure drives the proof masses corresponding to the X, Y and Z axes, the proof masses interfere with each other when they are moving, resulting in signal crosstalk among the X, Y and Z axes.

Therefore, reducing the inter-axial signal crosstalk is an important issue for those skilled in the art.

SUMMARY

The technical problem to be solved by the present invention is the signal crosstalk among the difference axis. To achieve the objective of reducing inter-axial signal crosstalk, the present invention provides a three-axis MEMS gyroscope.

The present invention provides the following technical solution.

A three-axis MEMS gyroscope includes a central anchor, a first subsidiary proof mass, a second subsidiary proof mass and a third subsidiary proof mass, wherein the central anchor, the first subsidiary proof mass, the second subsidiary proof mass and the third subsidiary proof mass are arranged in order from the inside to the outside. In the driving mode, the three-axis MEMS gyroscope resonates around the third direction. In the detection mode, the first subsidiary proof mass may resonate around the axis in the first direction, the second subsidiary proof mass may resonate around the axis in the second direction, and the third subsidiary proof mass may resonate along the first direction or the second direction. The first direction, the second direction and the third direction are perpendicular to each other. A first decoupling structure is disposed between the first subsidiary proof mass and the second subsidiary proof mass. The first decoupling structure is symmetrically connected to the first subsidiary proof mass along the first direction, and the first decoupling structure is symmetrically connected to the second subsidiary proof mass along the second direction.

Preferably, in the above-mentioned three-axis MEMS gyroscope, a second decoupling structure is disposed between the third subsidiary proof mass and the second subsidiary proof mass, and the second decoupling structure is symmetrically connected to the second subsidiary proof mass along the second direction.

Preferably, in the above-mentioned three-axis MEMS gyroscope, the first subsidiary proof mass is suspended on the central anchor through first springs symmetrically provided in the first direction.

Preferably, in the above-mentioned three-axis MEMS gyroscope, the first decoupling structure is suspended on the first subsidiary proof mass through second springs symmetrically provided in the first direction.

Preferably, in the above-mentioned three-axis MEMS gyroscope, the second subsidiary proof mass is suspended on the first decoupling structure through third springs symmetrically provided in the second direction.

Preferably, in the above-mentioned three-axis MEMS gyroscope, the second decoupling structure is suspended on the second subsidiary proof mass through fourth springs symmetrically in the second direction, and the third subsidiary proof mass is suspended on the second decoupling structure through a fifth spring.

Preferably, in the above-mentioned three-axis MEMS gyroscope, the third subsidiary proof mass includes sub-subsidiary proof masses arranged symmetrically in the first direction or symmetrically in the second direction. The number of the sub-subsidiary proof masses is an even number.

Preferably, in the above-mention three-axis MEMS gyroscope, the third subsidiary proof mass includes two sub-subsidiary proof masses arranged symmetrically in the first direction and two sub-subsidiary proof masses arranged symmetrically in the second direction.

Preferably, in the above-mentioned three-axis MEMS gyroscope, each sub-subsidiary proof mass in the third subsidiary proof mass corresponds to a sub-subsidiary detection electrode, and the sub-subsidiary detection electrode is a comb detection electrode.

Preferably, in the above-mentioned three-axis MEMS gyroscope, the adjacent sub-subsidiary proof masses in the third subsidiary proof mass are coupled to each other through a sixth spring.

Preferably, in the above-mentioned three-axis MEMS gyroscope, the second decoupling structure is further provided with a groove for receiving the sixth spring.

Preferably, in the above-mentioned three-axis MEMS gyroscope, a plurality of peripheral anchors are provided, and the second decoupling structure is connected to the plurality of peripheral anchors through seventh springs.

Preferably, in the above-mentioned three-axis MEMS gyroscope, the number of the peripheral anchors is four, and the four peripheral anchors are arranged at four corners of the second decoupling structure, respectively.

Preferably, in the above-mentioned three-axis MEMS gyroscope, driving electrodes of the three-axis MEMS gyroscope are symmetrically arranged at the four corners of the second decoupling structure for driving the second decoupling structure to resonate around the central anchor in the third direction.

Preferably, in the above-mentioned three-axis MEMS gyroscope, the axis around which the second decoupling structure rotates in the second direction is collinear with the axis around which the second subsidiary proof mass rotates in the second direction.

Preferably, in the above-mentioned three-axis MEMS gyroscope, the axis around which the first decoupling structure rotates in the first direction is collinear with the axis around which the first subsidiary proof mass rotates in the first direction.

Preferably, in the above-mentioned three-axis MEMS gyroscope, the intersection of the axis around which the first decoupling structure rotates in the first direction and the axis around which the second decoupling structure rotates in the second direction passes through the center of the central anchor.

The technical solutions described above show that, using the three-axis MEMS gyroscope in the embodiments of the present invention, when the first subsidiary proof mass resonates in the driving mode around the third direction, the first subsidiary proof mass approximately moves along the first direction. When the first subsidiary proof mass is subjected to an angular velocity around the second direction, a Coriolis force is generated along the third direction, and the first subsidiary proof mass shifts along the first direction under the effect of the Coriolis force. The axis of the first decoupling structure is also in the first direction and therefore, only a small part of force from the first subsidiary proof mass in the detection mode of the first direction is transmitted onto the first decoupling structure. Accordingly, the force from the first decoupling structure to the second subsidiary proof mass is quite small, thereby reducing the motion interference between the first subsidiary proof mass and the second subsidiary proof mass and diminishing the inter-axial signal crosstalk of the three-axis MEMS gyroscope.

BRIEF DESCRIPTION OF THE DRAWINGS

In order to clearly describe the embodiments of the present invention or the technical solutions in the prior art, the drawings required in the descriptions of the embodiments or the prior art are briefly introduced below. The drawings described below are only some embodiments of the present invention, and other drawings can be obtained according to these drawings without creative work by those skilled in the art.

Figure 1:
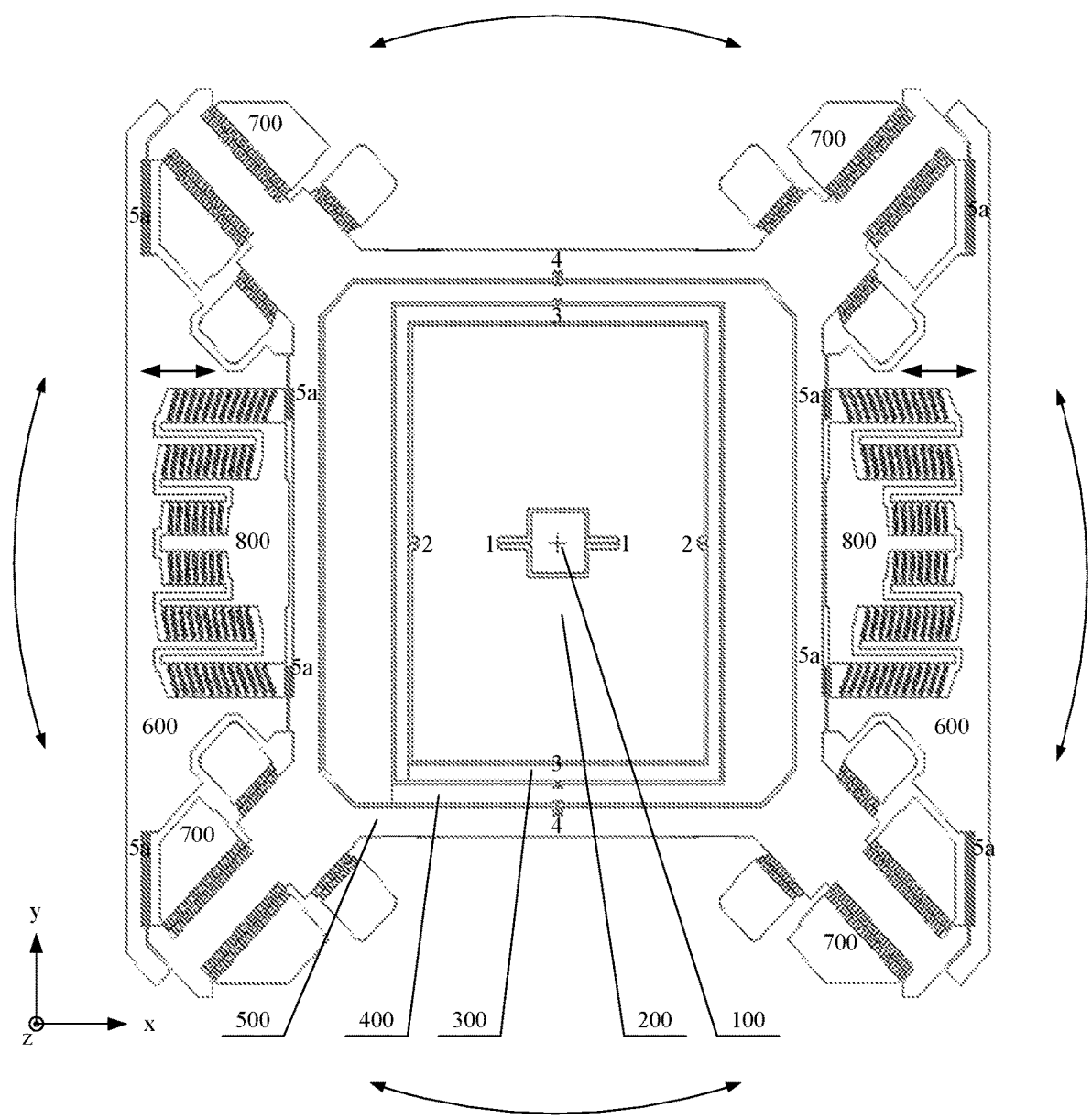
FIG. 1 is a top view showing the structure of the three-axis MEMS gyroscope according to embodiment 1 of the present invention.

In the drawings: 100. central anchor, 200. first subsidiary proof mass, 300. first decoupling structure, 400. second subsidiary proof mass, 500. second decoupling structure, 600. third subsidiary proof mass, 700. driving electrode, 800. third detection electrode, 900. peripheral anchor, 1. first spring, 2. second spring, 3. third spring, 4. fourth spring, 5a. fifth spring, 5b. fifth spring, 6. sixth spring, 7. seventh spring.

DETAILED DESCRIPTION OF THE EMBODIMENTS

The objective of the present invention is to provide a three-axis MEMS gyroscope to reduce inter-axial signal crosstalk.

Hereinafter, the embodiments are illustrated with reference to the drawings, and the embodiments described below do not limit the scope of the present invention defined in the claims in any way. In addition, the entire contents of the configurations shown in the following embodiments are not limited to those required as the solution of the present invention described in the claims.

Referring to FIGS. 1-4, the three-axis MEMS gyroscope according to embodiments of the present invention includes the central anchor 100, the first subsidiary proof mass 200, the second subsidiary proof mass 400 and the third subsidiary proof mass 600, wherein the central anchor 100, the first subsidiary proof mass 200, the second subsidiary proof mass 400 and the third subsidiary proof mass 600 are arranged in order from the inside to the outside. In the driving mode, the three-axis MEMS gyroscope resonates around the third direction z. In the detection mode, the first subsidiary proof mass 200 may resonate around the first direction x, the second subsidiary proof mass 400 may resonate around the second direction y, and the third subsidiary proof mass 600 may resonate around the first direction x or the second direction y. The first direction x, the second direction y and the third direction z are perpendicular to each other. The first decoupling structure 300 is disposed between the first subsidiary proof mass 200 and the second subsidiary proof mass 400. The first decoupling structure 300 is symmetrically connected to the first subsidiary proof mass 200 along the first direction, and the first decoupling structure 300 is symmetrically connected to the second subsidiary proof mass 400 along the second direction.

It should be noted that the first subsidiary proof mass 200 corresponds to the detection mode in the first direction x, the second subsidiary proof mass 400 corresponds to the detection mode in the second direction y, and the third subsidiary proof mass 600 corresponds to the detection mode in the third direction z. In the driving mode, the entire three-axis MEMS gyroscope resonates around the third direction z; the first subsidiary proof mass 200 approximately moves along the first direction x, and the second subsidiary proof mass 400 approximately moves along the second direction y, the third subsidiary proof mass 600 approximately moves along the first direction x or the second direction y.

When the first subsidiary proof mass 200 resonates in the driving mode around the third direction, the first subsidiary proof mass 200 approximately moves along the first direction x. When the first subsidiary proof mass 200 is subjected to an angular velocity around the second direction y, a Coriolis force is generated on the first subsidiary proof mass 200 along the third direction z, and the first subsidiary proof mass 200 produces a displacement around the first direction x. The displacement is detected by the first subsidiary detection electrode corresponding to the first subsidiary proof mass 200 to characterize the angular velocity around the second direction y.

When the second subsidiary proof mass 400 resonates in the driving mode around the third direction, the second subsidiary proof mass 400 approximately moves along the second direction y. When the second subsidiary proof mass 400 is subjected to an angular velocity around the first direction x, a Coriolis force is generated on the second subsidiary proof mass 400 along the third direction z, and the second subsidiary proof mass 400 produces a displacement around the second direction y. The displacement is detected by the second subsidiary detection electrode corresponding to the second subsidiary proof mass 400 to characterize the angular velocity around the first direction x.

When the third subsidiary proof mass 600 resonates in the driving mode around the third direction, the third subsidiary proof mass 600 approximately moves along the second direction y or the first direction x. When the third subsidiary proof mass 600 is subjected to an angular velocity around the third direction z, a Coriolis force is generated on the third subsidiary proof mass 600 along the first direction x, and the third subsidiary proof mass 600 produces a displacement along the first direction x; or, a Coriolis force is generated on the third subsidiary proof mass 600 along the second direction y, and the third subsidiary proof mass 600 produces a displacement along the second direction y. The displacement is detected by the third subsidiary detection electrode corresponding to the third subsidiary proof mass 600 to characterize the angular velocity around the third direction z.

According to the three-axis MEMS gyroscope in the embodiments of the present invention, only a small part of force from the first subsidiary proof mass 200 in the detection mode of the first direction x is transmitted onto the first decoupling structure 300 by setting the first decoupling structure 300, so as to achieve the decoupling between the first subsidiary proof mass 200 and the second subsidiary proof mass 400. Only a small part of force from the second subsidiary proof mass 400 in the detection mode of the second direction y is transmitted onto the first decoupling structure 300, so as to achieve the decoupling between the second subsidiary proof mass 400 and the first subsidiary proof mass 200. Specifically, when the first subsidiary proof mass 200 resonates in the driving mode around the third direction z, the first subsidiary proof mass 200 approximately moves along the first direction x. At this time, if the first subsidiary proof mass 200 is subjected to an angular velocity around the second direction y, the first subsidiary proof mass 200 will be subjected to the Coriolis force along the third direction z, and the first subsidiary proof mass 200 will generate a displacement around the first direction x. Since the first decoupling structure 300 is symmetrically connected to the first subsidiary proof mass 200 in the first direction x, only a small part of the force from the first subsidiary proof mass 200 in the detection mode of the first direction x is transmitted to the first decoupling structure 300, and accordingly, the force from the first decoupling structure 300 to the second subsidiary proof mass 400 is quite small, thereby reducing the motion interference between the first subsidiary proof mass 200 and the second subsidiary proof mass 400 and diminishing the inter-axial signal crosstalk of the three-axis MEMS gyroscope.

Conversely, when the second subsidiary proof mass 400 resonates in the driving mode around the third direction z, the second subsidiary proof mass 400 approximately moves along the second direction y. At this time, if the second subsidiary proof mass 400 is subjected to an angular velocity around the first direction x, the second subsidiary proof mass 400 will be subjected to the Coriolis force along the third direction z, and the second subsidiary proof mass 400 will generate a displacement around the second direction y. Since the first decoupling structure 300 is symmetrically mounted on the second subsidiary proof mass 400 in the second direction, only a small part of the force from the second subsidiary proof mass 400 in the detection mode of the second direction y is transmitted to the first decoupling structure 300, and accordingly, the force from the first decoupling structure 300 to the first subsidiary proof mass 200 is quite small, thereby reducing the motion interference between the second subsidiary proof mass 400 and the first subsidiary proof mass 200 and diminishing the inter-axial signal crosstalk of the three-axis MEMS gyroscope.

There are many ways to detect the displacement described above. In the embodiments of the present invention, the first subsidiary proof mass 200 corresponds to the first subsidiary detection electrode, the second subsidiary proof mass 400 corresponds to the second subsidiary detection electrode, and the third subsidiary proof mass 600 corresponds to the third subsidiary detection electrode 800, wherein, the first subsidiary detection electrode and the first subsidiary proof mass 200 are arranged along the third direction z, and the second subsidiary detection electrode and the second subsidiary proof mass 400 are arranged along the third direction z. The third subsidiary detection electrode corresponding to the third subsidiary proof mass 600 and the third subsidiary proof mass 600 are in the plane defined by the first direction x and the second direction y.

The first subsidiary proof mass 200 mentioned above can rotate around the axis in the first direction x, and the first decoupling structure 300 can rotate around the axis in the first direction x. When the axis around which the first subsidiary proof mass 200 rotates in the first direction x is collinear (overlap) with the axis around which the first decoupling structure 300 rotates in the first direction x, the force transmitted from the first subsidiary proof mass 200 to the first decoupling structure 300 through the second spring 2 is negligible, and the force transmitted from the first decoupling structure 300 to the second subsidiary proof mass 400 through the third spring 3 is much smaller. In this arrangement, the mechanical decoupling of the first subsidiary proof mass 200 and the second subsidiary proof mass 400 and the mechanical decoupling of the second subsidiary proof mass 400 and the first subsidiary proof mass 200 are completely achieved.

To further reduce the inter-axial signal crosstalk, in the three-axis MEMS gyroscope, the second decoupling structure 500 is disposed between the third subsidiary proof mass 600 and the second subsidiary proof mass 400, and the second decoupling structure 500 is symmetrically connected to the second subsidiary proof mass 400 along the second direction y. By setting the second decoupling structure 500, only a small part of the force from the second subsidiary proof mass 400 in the detection mode of the second direction y is transmitted onto the second decoupling structure 500, so as to achieve the decoupling between the second subsidiary proof mass 400 and the third subsidiary proof mass 600; only a small part of the force from the third subsidiary proof mass 600 in the detection mode of the third direction z is transmitted onto the second decoupling structure 500, so as to achieve the decoupling between the third subsidiary proof mass 600 and the second subsidiary proof mass 400.

Specifically, when the second subsidiary proof mass 400 resonates in the driving mode around the third direction z, the second subsidiary proof mass 400 approximately moves along the second direction y. At this time, if the second subsidiary proof mass 400 is subjected to an angular velocity around the first direction x, the second subsidiary proof mass 400 will be subjected to the Coriolis force along the third direction z, and the second subsidiary proof mass 400 will generate a displacement around the second direction y. Since the second decoupling structure 500 is symmetrically connected to the second subsidiary proof mass 400 in the second direction y, only a small part of the force from the second subsidiary proof mass 400 in the detection mode of the second direction y is transmitted to the second decoupling structure 500, and accordingly, the force from the second decoupling structure 500 to the third subsidiary proof mass 600 is quite small, thereby reducing the motion interference between the second subsidiary proof mass 400 and the third subsidiary proof mass 600 and diminishing the inter-axial signal crosstalk of the three-axis MEMS gyroscope.

Conversely, when the third subsidiary proof mass 600 resonates in the driving mode around the third direction z, the third subsidiary proof mass 600 approximately moves along the second direction y. At this time, if the third subsidiary proof mass 600 is subjected to an angular velocity around the third direction z, the third subsidiary proof mass 600 will be subjected to the Coriolis force along the first direction x, and the third subsidiary proof mass 600 will generate a displacement along the first direction x. Since the stiffness between the second decoupling structure 500 and the third subsidiary proof mass 600 is relatively small along the first direction x, when the third subsidiary proof mass 600 is in the detection mode along the first direction x, the second decoupling structure 500 and the third subsidiary proof mass 600 are more likely to deform and absorb most of the energy. Therefore, only a small part of the force from the third subsidiary proof mass 600 is transmitted to the second decoupling structure 500, and accordingly, the force from the second decoupling structure 500 to the second subsidiary proof mass 400 is quite small, thereby reducing the motion interference between the third subsidiary proof mass 600 and the second subsidiary proof mass 400 and diminishing the inter-axial signal crosstalk of the three-axis MEMS gyroscope.

Alternatively, when the third subsidiary proof mass 600 resonates in the driving mode around the third direction z, the third subsidiary proof mass 600 approximately moves along the first direction x. At this time, if the third subsidiary proof mass 600 is subjected to an angular velocity around the third direction z, the third subsidiary proof mass 600 will be subjected to the Coriolis force along the second direction y, and the third subsidiary proof mass 600 will generate a displacement along the second direction y. Since the stiffness between the second decoupling structure 500 and the third subsidiary proof mass 600 is relatively small along the second direction y, when the third subsidiary proof mass 600 is in the detection mode along the second direction y, the second decoupling structure 500 and the third subsidiary proof mass 600 are more likely to deform and absorb most of the energy. Therefore, only a small part of the force from the third subsidiary proof mass 600 is transmitted to the second decoupling structure 500, and accordingly, the force from the second decoupling structure 500 to the second subsidiary proof mass 400 is quite small, thereby reducing the motion interference between the third subsidiary proof mass 600 and the second subsidiary proof mass 400 and diminishing the inter-axial signal crosstalk of the three-axis MEMS gyroscope.

The second subsidiary proof mass 400 mentioned above can rotate around the axis in the second direction y, and the second decoupling structure 500 can rotate around the axis in the second direction y. When the axis around which the second subsidiary proof mass 400 rotates in the second direction y is collinear (overlap) with the axis around which the second decoupling structure 500 rotates in the second direction y, the force transmitted from the second subsidiary proof mass 400 to the second decoupling structure 500 through the fourth spring 4 is negligible, and the force transmitted from the second decoupling structure 500 to the third subsidiary proof mass 600 through the fifth spring 5 is much smaller. In this arrangement, the mechanical decoupling between the second subsidiary proof mass 400 and the third subsidiary proof mass 600 and the mechanical decoupling between the third subsidiary proof mass 600 and the second subsidiary proof mass 400 are completely achieved.

In order to further optimize the above solution, the intersection of the axis around which the first decoupling structure 300 rotates along the first direction x and the axis around which the second decoupling structure 500 rotates along the second direction y passes through the center of the central anchor 100.

In the embodiments of the present invention, the connection between the first subsidiary proof mass and the central anchor, the connection between the first decoupling structure and the first subsidiary proof mass, the connection between the first decoupling structure and the second subsidiary proof mass, the connection between the second subsidiary proof mass and the second decoupling and the connection between the second decoupling structure and the third subsidiary mass are all achieved by springs. The springs may be the elastic beams or the folding beams. The first subsidiary proof mass 200 is suspended on the central anchor 100 through the first springs 1 that are symmetrically provided in the first direction x. The first decoupling structure 300 is suspended on the first subsidiary proof mass 200 through the second springs 2 that are symmetrically provided in the first direction x. The second subsidiary proof mass 400 is suspended on the first decoupling structure 300 through the third springs 3 that are symmetrically provided in the second direction y.

The second decoupling structure 500 is suspended on the second subsidiary proof mass 400 through the fourth springs 4 that are symmetrically provided in the second direction y, and the third subsidiary proof mass 600 is suspended on the second decoupling structure 500 through the fifth spring.

When the third subsidiary proof mass 600 resonates in the driving mode around the third direction, the third subsidiary proof mass 600 approximately moves along the second direction y or the first direction x. If the third subsidiary proof mass 600 is subjected to an angular velocity around the third direction z, the third subsidiary proof mass 600 will be subjected to the Coriolis force along the first direction x or the Coriolis force along the second direction y. For this reason, the third subsidiary proof mass 600 of the present embodiment includes sub-subsidiary proof masses arranged symmetrically in the first direction x or symmetrically in the second direction y. The number of the sub-subsidiary proof masses is even number, and each sub-subsidiary proof mass is suspended on the second decoupling structure 500 through the fifth spring. The two sub-subsidiary proof masses located on the left and right sides are suspended on the second decoupling structure 500 through the fifth spring 5a, and the sub-subsidiary proof masses located on the upper and lower sides are suspended on the second decoupling structure 500 through the fifth spring 5*b*. Each sub-subsidiary proof mass in the third subsidiary proof mass 600 corresponds to a sub-subsidiary detection electrode, and the sub-subsidiary detection electrode is the comb detection electrode.

The adjacent sub-subsidiary proof masses in the third subsidiary proof mass 600 are coupled to each other through the sixth spring 6, which further ensures the consistency of the vibration frequency and amplitude, reduces the requirement for processing consistency, and enhances the ability to resist external shocks. In order to reduce the occupied area, the second decoupling structure 500 is further provided with the groove for receiving the sixth spring 6.

In addition, in the embodiments of the present invention, in addition to the central anchor 100, the peripheral anchors 900 may be provided. The central anchor 100 and the peripheral anchors 900 are connected to the substrate, and when the driving electrode 700 drives the whole three-axis MEMS gyroscope to resonate around the third direction z, the central anchor 100 and the peripheral anchors 900 do not move. The central anchor 100 is arranged in the center of the three-axis MEMS gyroscope, and the peripheral anchors 900 are located around the central anchor 100. The number of the peripheral anchors 900 is multiple, and the multiple peripheral anchors 900 are symmetrically arranged.

Embodiment 1

Referring to FIG. 1, in this embodiment, the three-axis MEMS gyroscope includes the central anchor 100, the first subsidiary proof mass 200, the first decoupling structure 300, the second subsidiary proof mass 400, the second decoupling structure 500, and the third subsidiary proof mass 600. The third subsidiary proof mass 600 includes two sub-subsidiary proof masses arranged symmetrically in the first direction x, and the two sub-subsidiary proof masses are suspended on the second decoupling structure 500 through the fifth spring 5*a*.

The first subsidiary proof mass 200 is connected to the central anchor 100 through the first springs 1. The first subsidiary proof mass 200 is connected to the first decoupling structure 300 surrounding the first subsidiary proof mass 200 through the second springs 2. The first decoupling structure 300 is connected to the second subsidiary proof mass 400 through the third springs 3. The second subsidiary proof mass 400 is connected to the second decoupling structure 500 through the fourth springs 4. The second decoupling structure 500 is connected to the third subsidiary proof mass 600 through the fifth springs.

The stiffness of the first spring 1 and the second spring 2 is small around the first direction x, so that the first subsidiary proof mass 200 rotates around the first direction x. The stiffness of the third spring 3 is large around the first direction x, so that the first decoupling structure 300 does not rotate in the first direction x along with the second subsidiary proof mass 400.

The stiffness of the third spring 3 and the fourth spring 4 is small around the second direction y, so that the second subsidiary proof mass 400 rotates around the second direction y. The stiffness of the fifth spring 5*a* is large around the second direction y, so that the second decoupling structure 500 does not rotate in the second direction y along with the second subsidiary proof mass 400.

The stiffness of the fifth spring 5*a* is small along the first direction x, so that the two sub-subsidiary proof masses located on the left and right in the third subsidiary proof mass 600 are prone to moving along the first direction x.

In the driving mode, the driving electrode 700 drives the second decoupling structure 500 to resonate around the third direction z, and sequentially drives each proof mass to resonate around the third direction z through the springs connected to each other.

When the three-axis MEMS gyroscope is subjected to an angular velocity around the second direction y, the first subsidiary proof mass 200 is subjected to the Coriolis force along the third direction z, and the first subsidiary proof mass 200 produces a displacement around the first direction x. The displacement is detected to characterize the angular velocity around the second direction y.

When the three-axis MEMS gyroscope is subjected to an angular velocity around the first direction x, the second subsidiary proof mass 400 is subjected to the Coriolis force along the third direction z, and the second subsidiary proof mass 400 produces a displacement around the second direction y. The displacement is detected to characterize the angular velocity around the first direction x.

When the three-axis MEMS gyroscope is subjected to an angular velocity around the third direction z, the two sub-subsidiary proof masses located on the left and right in the third subsidiary proof mass 600 are subjected to the Coriolis force along the first direction x, and the two sub-subsidiary proof masses generate a displacement along the first direction x. The displacement is detected to characterize the angular velocity around the third direction z.

Embodiment 2

Figure 2:
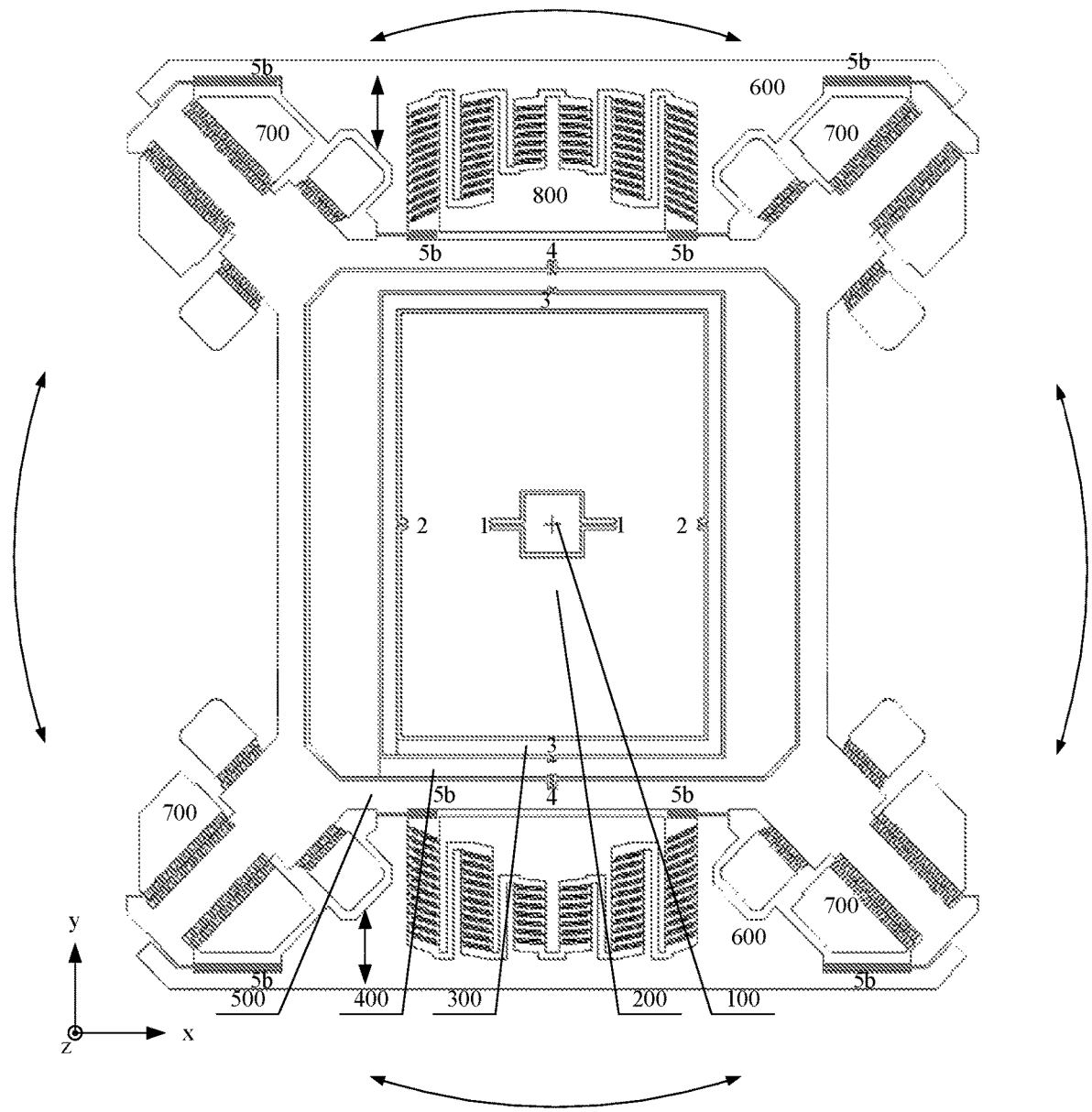
FIG. 2 is a top view showing the structure of the three-axis MEMS gyroscope according to embodiment 2 of the present invention.

Referring to FIG. 2, in this embodiment, the three-axis MEMS gyroscope includes the central anchor 100, the first subsidiary proof mass 200, the first decoupling structure 300, the second subsidiary proof mass 400, the second decoupling structure 500, and the third subsidiary proof mass 600. The third subsidiary proof mass 600 includes two sub-subsidiary proof masses arranged symmetrically in the second direction y, and the two sub-subsidiary proof masses are suspended on the second decoupling structure 500 through the fifth springs 5*b*.

The first subsidiary proof mass 200 is connected to the central anchor 100 through the first springs 1. The first subsidiary proof mass 200 is connected to the first decoupling structure 300 surrounding the first subsidiary proof mass 200 through the second springs 2. The first decoupling structure 300 is connected to the second subsidiary proof mass 400 through the third springs 3. The second subsidiary proof mass 400 is connected to the second decoupling structure 500 through the fourth springs 4. The second decoupling structure 500 is connected to the third subsidiary proof mass 600 through the fifth springs 5*b*.

The stiffness of the first spring 1 and the second spring 2 is small around the first direction x, so that the first subsidiary proof mass 200 rotates around the first direction x. The stiffness of the third spring 3 is large around the first direction x, so that the first decoupling structure 300 does not rotate in the first direction x along with the second subsidiary proof mass 400.

The stiffness of the third spring 3 and the fourth spring 4 is small around the second direction y, so that the second subsidiary proof mass 400 rotates around the second direction y. The stiffness of the fifth spring 5*b* is large around the second direction y, so that the second decoupling structure 500 does not rotate in the second direction y along with the second subsidiary proof mass 400.

The stiffness of the fifth spring 5b is small along the second direction y, so that the two sub-subsidiary proof masses located on the upper and lower in the third subsidiary proof mass 600 are prone to moving along the second direction y.

In the driving mode, the driving electrode 700 drives the second decoupling structure 500 to resonate around the third direction z, and sequentially drives each proof mass to resonate around the third direction z through the springs connected to each other.

When the three-axis MEMS gyroscope is subjected to an angular velocity around the second direction y, the first subsidiary proof mass 200 is subjected to the Coriolis force along the third direction z, and the first subsidiary proof mass 200 produces a displacement around the first direction x. The displacement is detected to characterize the angular velocity around the second direction y.

When the three-axis MEMS gyroscope is subjected to an angular velocity around the first direction x, the second subsidiary proof mass 400 is subjected to the Coriolis force along the third direction z, and the second subsidiary proof mass 400 produces a displacement around the second direction y. The displacement is detected to characterize the angular velocity around the first direction x.

When the three-axis MEMS gyroscope is subjected to an angular velocity around the third direction z, the two sub-subsidiary proof masses located on the upper and lower in the third subsidiary proof mass 600 are subjected to the Coriolis force along the second direction y, and the two sub-subsidiary proof masses generate a displacement along the second direction y. The displacement is detected to characterize the angular velocity around the third direction z.

Embodiment 3

Figure 3:
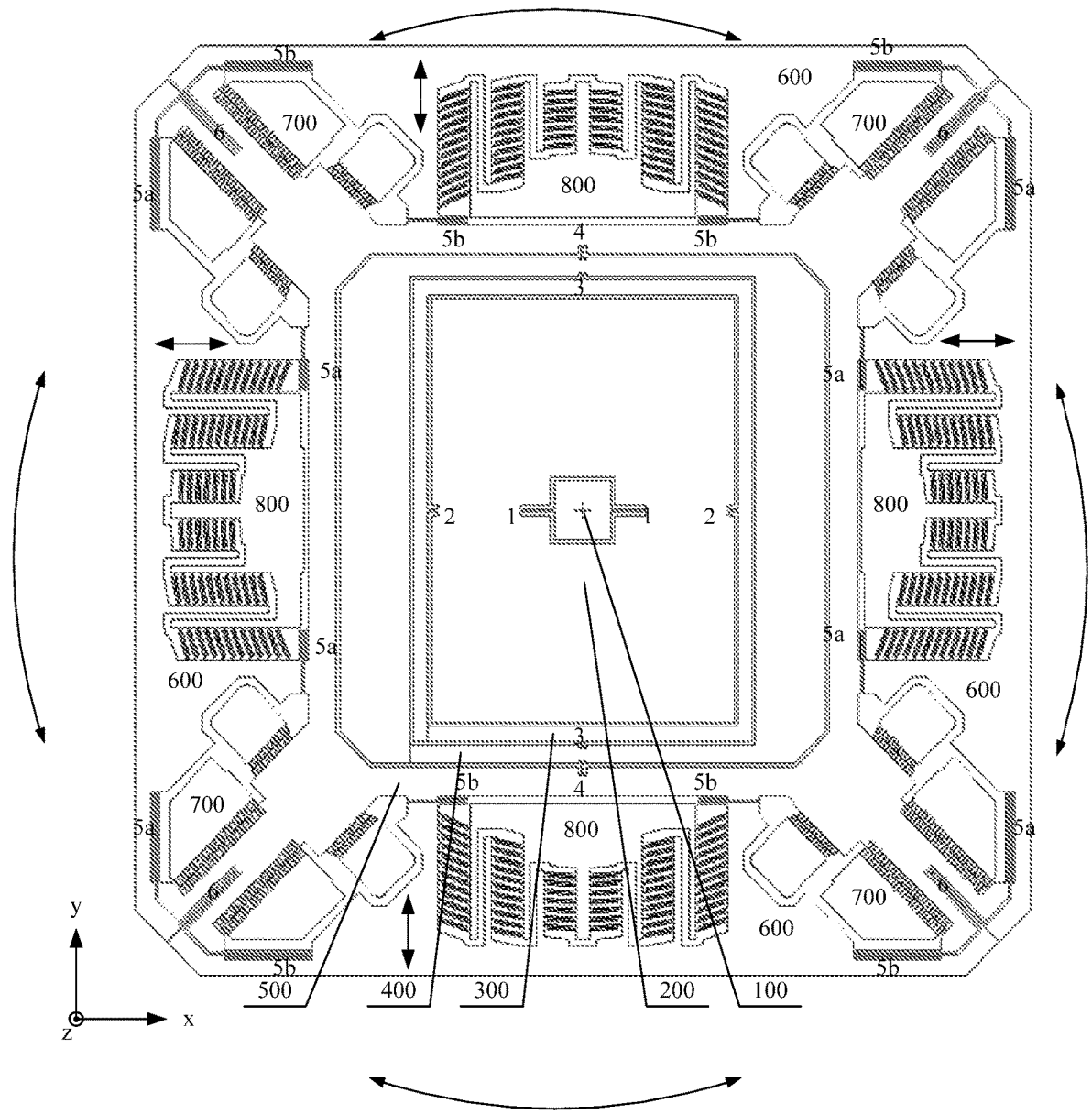
FIG. 3 is a top view showing the structure of the three-axis MEMS gyroscope according to embodiment 3 of the present invention.

Referring to FIG. 3, in this embodiment, the three-axis MEMS gyroscope includes the central anchor 100, the first subsidiary proof mass 200, the first decoupling structure 300, the second subsidiary proof mass 400, the second decoupling structure 500, and the third subsidiary proof mass 600. The third subsidiary proof mass 600 includes two sub-subsidiary proof masses arranged symmetrically in the first direction x and two sub-subsidiary proof masses arranged symmetrically in the second direction y, and the four sub-subsidiary proof masses are suspended on the second decoupling structure 500 through the fifth springs. The four sub-subsidiary proof masses are coupled to each other through the sixth springs.

The first subsidiary proof mass 200 is connected to the central anchor 100 through the first springs 1. The first subsidiary proof mass 200 is connected to the first decoupling structure 300 surrounding the first subsidiary proof mass 200 through the second springs 2. The first decoupling structure 300 is connected to the second subsidiary proof mass 400 through the third springs 3. The second subsidiary proof mass 400 is connected to the second decoupling structure 500 through the fourth springs 4. The two sub-subsidiary proof masses located on the left and right in the third subsidiary proof mass 600 are connected to the second decoupling structure 500 through the fifth springs 5a, and the two sub-subsidiary proof masses located on the upper and lower in the third subsidiary proof mass 600 are connected to the second decoupling structure 500 through the fifth springs 5b.

The stiffness of the first spring 1 and the second spring 2 is small around the first direction x, so that the first subsid-iary proof mass 200 rotates around the first direction x. The stiffness of the third spring 3 is large around the first direction x, so that the first decoupling structure 300 does not rotate in the first direction x along with the second subsidiary proof mass 400.

The stiffness of the third spring 3 and the fourth spring 4 is small around the second direction y, so that the second subsidiary proof mass 400 rotates around the second direction y. The stiffness of the fifth spring is large around the second direction y, so that the second decoupling structure 500 does not rotate in the second direction y along with the second subsidiary proof mass 400.

The stiffness of the fifth spring 5a which connects the two sub-subsidiary proof masses located on the left and right in the third subsidiary proof mass 600 to the second decoupling structure 500 is small along the first direction x, so that the two sub-subsidiary proof masses located on the left and right in the third subsidiary proof mass 600 are easy to move along the first direction x.

The stiffness of the fifth spring 5b which connects the two sub-subsidiary proof masses located on the upper and lower in the third subsidiary proof mass 600 to the second decoupling structure 500 is small along the second direction y, so that the two sub-subsidiary proof masses located on the upper and lower in the third subsidiary proof mass 600 are easy to move along the second direction y.

In the driving mode, the driving electrode 700 drives the second decoupling structure 500 to resonate around the third direction z, and sequentially drives each proof mass to resonate around the third direction z through the springs connected to each other.

When the three-axis MEMS gyroscope is subjected to an angular velocity around the second direction y, the first subsidiary proof mass 200 is subjected to the Coriolis force along the third direction z, and the first subsidiary proof mass 200 produces a displacement around the first direction x. The displacement is detected to characterize the angular velocity around the second direction y.

When the three-axis MEMS gyroscope is subjected to an angular velocity around the first direction x, the second subsidiary proof mass 400 is subjected to the Coriolis force along the third direction z, and the second subsidiary proof mass 400 produces a displacement around the second direction y. The displacement is detected to characterize the angular velocity around the first direction x.

When the three-axis MEMS gyroscope is subjected to an angular velocity around the third direction z, the two sub-subsidiary proof masses located on the left and right in the third subsidiary proof mass 600 are subjected to the Coriolis force along the first direction x, and the two sub-subsidiary proof masses located on the left and right in the third subsidiary proof mass 600 generate a displacement along the first direction x; the two sub-subsidiary proof masses located on the upper and lower in the third subsidiary proof mass 600 are subjected to the Coriolis force along the second direction y, and the two sub-subsidiary proof masses located on the upper and lower in the third subsidiary proof mass 600 generate a displacement along the second direction y. The above four sub-subsidiary proof masses are coupled to each other through the sixth springs 6. The displacement is detected to characterize the angular velocity around the third direction z.

Embodiment 4

Figure 4:
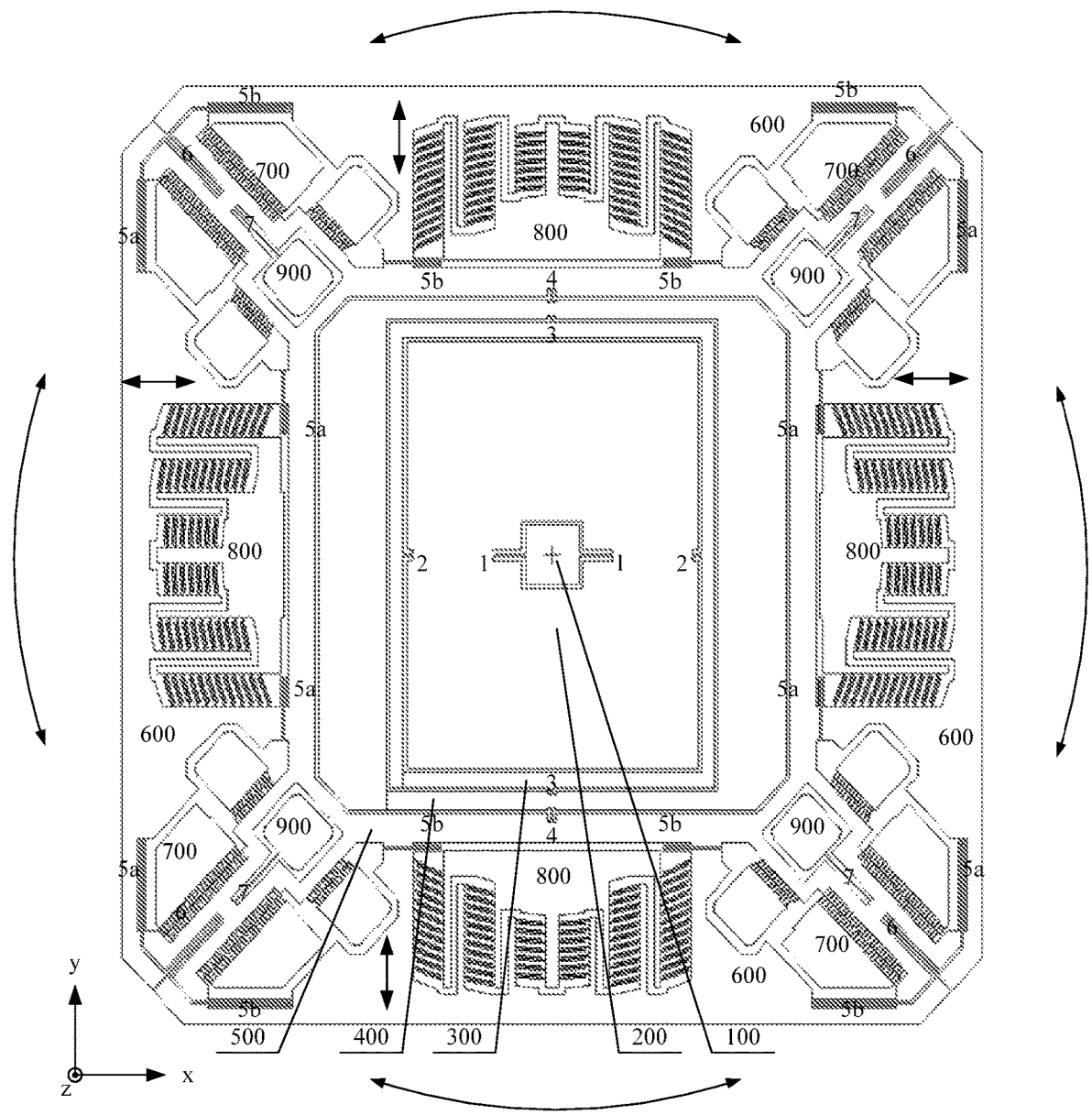
FIG. 4 is a top view showing the structure of the three-axis MEMS gyroscope according to embodiment 4 of the present invention.

Referring to FIG. 4, in this embodiment, the three-axis MEMS gyroscope includes the central anchor 100, four peripheral anchors 900, the first subsidiary proof mass 200, the first decoupling structure 300, the second subsidiary proof mass 400, the second decoupling structure 500, and the third subsidiary proof mass 600. The third subsidiary proof mass 600 includes two sub-subsidiary proof masses arranged symmetrically in the first direction x and two sub-subsidiary proof masses arranged symmetrically in the second direction y. The two sub-subsidiary proof masses located on the left and right in the third subsidiary proof mass 600 are connected to the second decoupling structure 500 through the fifth springs 5a, and the two sub-subsidiary proof masses located on the upper and lower in the third subsidiary proof mass 600 are connected to the second decoupling structure 500 through the fifth springs 5b. The four sub-subsidiary proof masses are coupled to each other through the sixth springs 6.

The first subsidiary proof mass 200 is connected to the central anchor 100 through the first springs 1. The first subsidiary proof mass 200 is connected to the first decoupling structure 300 surrounding the first subsidiary proof mass 200 through the second springs 2. The first decoupling structure 300 is connected to the second subsidiary proof mass 400 through the third springs 3. The second subsidiary proof mass 400 is connected to the second decoupling structure 500 through the fourth springs 4. The second decoupling structure 500 is connected to the third subsidiary proof mass 600 through the fifth springs, and the second decoupling structure 500 is connected to the peripheral anchors 900 through the seventh springs 7. The number of the peripheral anchors 900 is four, and the four peripheral anchors are arranged at the four corners of the second decoupling structure 500, respectively.

The driving electrodes 700 of the three-axis MEMS gyroscope are symmetrically arranged at the four corners of the second decoupling structure 500 for driving the second decoupling structure 500 to resonate around the central anchor 100 in the third direction z.

The stiffness of the first spring 1 and the second spring 2 is small around the first direction x, so that the first subsidiary proof mass 200 rotates around the first direction x. The stiffness of the third spring 3 is large around the first direction x, so that the first decoupling structure 300 does not rotate in the first direction x along with the second subsidiary proof mass 400.

The stiffness of the third spring 3 and the fourth spring 4 is small around the second direction y, so that the second subsidiary proof mass 400 rotates around the second direction y. The stiffness of the fifth spring is large around the second direction y, so that the second decoupling structure 500 does not rotate in the second direction y along with the second subsidiary proof mass 400.

The stiffness of the fifth spring 5a which connects the two sub-subsidiary proof masses located on the left and right in the third subsidiary proof mass 600 to the second decoupling structure 500 is small along the first direction x, so that the two sub-subsidiary proof masses located on the left and right in the third subsidiary proof mass 600 are easy to move along the first direction x.

The stiffness of the fifth spring 5b which connects the two sub-subsidiary proof masses located on the upper and lower in the third subsidiary proof mass 600 to the second decoupling structure 500 is small along the second direction y, so that the two sub-subsidiary proof masses located on the upper and lower in the third subsidiary proof mass 600 are easy to move along the second direction y.

The stiffness of the first spring 1 and the seventh spring 7 is small around the third direction z, and a driving mode in which the moveable subsidiary proof masses move back and forth around the third direction z in the plane defined by the first direction x and the second direction y.

In the driving mode, the driving electrode 700 drives the second decoupling structure 500 to resonate around the third direction z, and sequentially drives each proof mass to resonate around the third direction z through the springs connected to each other.

When the three-axis MEMS gyroscope is subjected to an angular velocity around the second direction y, the first subsidiary proof mass 200 is subjected to the Coriolis force along the third direction z, and the first subsidiary proof mass 200 produces a displacement around the first direction x. The displacement is detected to characterize the angular velocity around the second direction y.

When the three-axis MEMS gyroscope is subjected to an angular velocity around the first direction x, the second subsidiary proof mass 400 is subjected to the Coriolis force along the third direction z, and the second subsidiary proof mass 400 produces a displacement around the second direction y. The displacement is detected to characterize the angular velocity around the first direction x.

When the three-axis MEMS gyroscope is subjected to an angular velocity around the third direction z, the two sub-subsidiary proof masses located on the left and right in the third subsidiary proof mass 600 are subjected to the Coriolis force along the first direction x, and the two sub-subsidiary proof masses located on the left and right in the third subsidiary proof mass 600 generate a displacement along the first direction x; the two sub-subsidiary proof masses located on the upper and lower in the third subsidiary proof mass 600 are subjected to the Coriolis force along the second direction y, and the two sub-subsidiary proof masses located on the upper and lower in the third subsidiary proof mass 600 generate a displacement along the second direction y. The above four sub-subsidiary proof masses are coupled to each other through the sixth springs 6. The displacements are detected to characterize the angular velocity around the third direction z.

The embodiments disclosed above enables those skilled in the art to implement or use the present invention. Various modifications to these embodiments will be obvious to those skilled in the art. The general principles defined herein may be implemented in other embodiments without departing from the spirit or scope of the present invention. Therefore, the present invention will not be limited to these embodiments shown herein, but shall conform to the broadest scope consistent with the principles and novel features disclosed herein.

What is claimed is:

1. A three-axis MEMS gyroscope, comprising a central anchor, a first subsidiary proof mass, a second subsidiary proof mass and a third subsidiary proof mass, wherein the central anchor, the first subsidiary proof mass, the second subsidiary proof mass and the third subsidiary proof mass are arranged in order from the inside to the outside; in a driving mode, the three-axis MEMS gyroscope resonates around a third direction; in a detection mode, the first subsidiary proof mass resonates around a first direction, the second subsidiary proof mass resonates around a second direction, and the third subsidiary proof mass resonates around the first direction or the second direction; the first direction, the second direction and the third direction are perpendicular to each other, wherein, a first decoupling structure is disposed between the first subsidiary proof mass and the second subsidiary proof mass and a second decoupling structure is disposed between the third subsidiary proof mass and the second subsidiary proof mass, wherein the first decoupling structure and the second decoupling structure are symmetrically connected to the first subsidiary proof mass along the first direction and the second subsidiary proof mass along the second direction, respectively, and the first decoupling structure is symmetrically connected to the second subsidiary proof mass along the second direction, wherein, the first subsidiary proof mass is suspended on the central anchor through a plurality of first springs, and the plurality of first springs are symmetrically provided in the first direction, wherein, the first decoupling structure is suspended on the first subsidiary proof mass through a plurality of second springs, and the plurality of second springs are symmetrically provided in the first direction, wherein, the second subsidiary proof mass is suspended on the first decoupling structure through a plurality of third springs, and the plurality of third springs are symmetrically provided in the second direction, wherein, the second decoupling structure is suspended on the second subsidiary proof mass through a plurality of fourth springs, the plurality of fourth springs are symmetrically provided in the second direction, and the third subsidiary proof mass is suspended on the second decoupling structure through a fifth spring.

2. The three-axis MEMS gyroscope of claim 1, wherein, the third subsidiary proof mass comprises a plurality of sub-subsidiary proof masses, the plurality of sub-subsidiary proof masses are arranged symmetrically in the first direction or symmetrically in the second direction, and a number of the plurality of sub-subsidiary proof masses is even number.

3. The three-axis MEMS gyroscope of claim 2, wherein, the third subsidiary proof mass comprises two sub-subsidiary proof masses arranged symmetrically in the first direction and two sub-subsidiary proof masses arranged symmetrically in the second direction.

4. The three-axis MEMS gyroscope of claim 2, wherein, each of the plurality of sub-subsidiary proof masses in the third subsidiary proof mass corresponds to a sub-subsidiary detection electrode, and the sub-subsidiary detection electrode is a comb detection electrode.

5. The three-axis MEMS gyroscope of claim 2, wherein, adjacent sub-subsidiary proof masses in the third subsidiary proof mass are coupled to each other through a sixth spring.

6. The three-axis MEMS gyroscope of claim 5, wherein, the second decoupling structure is further provided with a groove for receiving the sixth spring.

7. A three-axis MEMS gyroscope, comprising a central anchor, a first subsidiary proof mass, a second subsidiary proof mass and a third subsidiary proof mass, wherein the central anchor, the first subsidiary proof mass, the second subsidiary proof mass and the third subsidiary proof mass are arranged in order from the inside to the outside; in a driving mode, the three-axis MEMS gyroscope resonates around a third direction; in a detection mode, the first subsidiary proof mass resonates around a first direction, the second subsidiary proof mass resonates around a second direction, and the third subsidiary proof mass resonates around the first direction or the second direction; the first direction, the second direction and the third direction are perpendicular to each other, wherein, a first decoupling structure is disposed between the first subsidiary proof mass and the second subsidiary proof mass and a second decoupling structure is disposed between the third subsidiary proof mass and the second subsidiary proof mass, wherein the first decoupling structure and the second decoupling structure are symmetrically connected to the first subsidiary proof mass along the first direction and the second subsidiary proof mass along the second direction, respectively, and the first decoupling structure is symmetrically connected to the second subsidiary proof mass along the second direction, wherein, the first subsidiary proof mass is suspended on the central anchor through a plurality of first springs, and the plurality of first springs are symmetrically provided in the first direction, wherein, the first decoupling structure is suspended on the first subsidiary proof mass through a plurality of second springs, and the plurality of second springs are symmetrically provided in the first direction, wherein, the second subsidiary proof mass is suspended on the first decoupling structure through a plurality of third springs, and the plurality of third springs are symmetrically provided in the second direction, wherein, the three-axis MEMS gyroscope further comprises a plurality of peripheral anchors, wherein the second decoupling structure is connected to the plurality of peripheral anchors through a plurality of seventh springs.

8. The three-axis MEMS gyroscope of claim 7, wherein, a number of the plurality of peripheral anchors is four, and the four peripheral anchors are arranged at four corners of the second decoupling structure, respectively.

9. A three-axis MEMS gyroscope, comprising a central anchor, a first subsidiary proof mass, a second subsidiary proof mass and a third subsidiary proof mass, wherein the central anchor, the first subsidiary proof mass, the second subsidiary proof mass and the third subsidiary proof mass are arranged in order from the inside to the outside; in a driving mode, the three-axis MEMS gyroscope resonates around a third direction; in a detection mode, the first subsidiary proof mass resonates around a first direction, the second subsidiary proof mass resonates around a second direction, and the third subsidiary proof mass resonates around the first direction or the second direction; the first direction, the second direction and the third direction are perpendicular to each other, wherein, a first decoupling structure is disposed between the first subsidiary proof mass and the second subsidiary proof mass and a second decoupling structure is disposed between the third subsidiary proof mass and the second subsidiary proof mass, wherein the first decoupling structure and the second decoupling structure are symmetrically connected to the first subsidiary proof mass along the first direction and the second subsidiary proof mass along the second direction, respectively, and the first decoupling structure is symmetrically connected to the second subsidiary proof mass along the second direction, wherein, driving electrodes of the three-axis MEMS gyroscope are symmetrically arranged at four corners of the second decoupling structure for driving the second decoupling structure to resonate around the central anchor in the third direction.

10. The three-axis MEMS gyroscope of claim 1, wherein, the second decoupling structure rotates around a first axis in the second direction, the second subsidiary proof mass rotates around a second axis in the second direction, and the first axis is collinear with the second axis.

11. The three-axis MEMS gyroscope of claim 10, wherein, the first decoupling structure rotates around a third axis in the first direction, the first subsidiary proof mass rotates around a fourth axis in the first direction, and the third axis is collinear with the fourth axis.

12. The three-axis MEMS gyroscope of claim 11, wherein, an intersection of the third axis and the first axis passes through a center of the central anchor.

\* \* \* \* \*